(12) United States Patent
Rooney et al.

(10) Patent No.: US 6,217,762 B1
(45) Date of Patent: Apr. 17, 2001

(54) SPECIALLY ADAPTED OIL FILTER CASING

(76) Inventors: Jeffrey G. Rooney, Roon Enterprises, 3336 J.N. Texas St., #305, Fairfield, CA (US) 94533-9578; Robert A. Dixon, 3900 W. Barnhart Rd., Turlock, CA (US) 95380

( * ) Notice: Subject to any disclaimer, the term of this patent is extended or adjusted under 35 U.S.C. 154(b) by 0 days.

(21) Appl. No.: 09/280,051

(22) Filed: Mar. 29, 1999

(51) Int. Cl.⁷ .................................................. B01D 27/08
(52) U.S. Cl. .................. 210/232; 210/443; 210/DIG. 17
(58) Field of Search .................. 210/232, 238, 210/435, 437, 443, 470, 497.01, 237, DIG. 17; 215/302, 390; 220/284, 286, 735; 81/3.43; D23/209

(56) References Cited

U.S. PATENT DOCUMENTS

| | | | |
|---|---|---|---|
| 791,061 | * | 5/1905 | West . |
| 1,202,370 | * | 10/1916 | Egle et al. . |
| 3,224,585 | * | 12/1965 | Scavuzzo et al. . |
| 3,473,666 | * | 10/1969 | Humbert . |
| 4,266,452 | | 5/1981 | Crist . |
| 4,364,829 | * | 12/1982 | Atkins et al. . |
| 4,465,595 | | 8/1984 | Cooper . |
| 4,643,053 | * | 2/1987 | Rhodes . |
| 4,871,455 | | 10/1989 | Terhune et al. . |
| 4,988,437 | | 1/1991 | Gefter et al. . |
| 4,992,166 | * | 2/1991 | Lowsky et al. . |
| 5,000,847 | | 3/1991 | Huang . |
| 5,024,760 | | 6/1991 | Kemper . |
| 5,180,489 | | 1/1993 | Bourgeois . |
| 5,230,795 | | 7/1993 | Yang . |
| 5,328,606 | | 7/1994 | Warren et al. . |
| 5,469,935 | | 11/1995 | Hewuse . |
| 5,487,447 | * | 1/1996 | Velazquez . |
| 5,744,032 | | 4/1998 | Kemper . |

FOREIGN PATENT DOCUMENTS

| | | |
|---|---|---|
| 1189520 | 3/1965 | (DE) . |
| 2300600 | 10/1976 | (FR) . |

* cited by examiner

Primary Examiner—Matthew O. Savage
Assistant Examiner—David Sorkin
(74) Attorney, Agent, or Firm—Richard C. Litman

(57) ABSTRACT

An internal combustion engine oil filter casing specially adapted for engagement by a standard hand tool and to an oil filter employing such a casing to assist an operator in removing the oil filter from an engine block. The casing comprises a generally tubular body and different structures that are rigidly affixed to the tubular body for engaging the tool to assist the operator in removing the oil filter from the engine block. The tubular body has a first end, a second end, and a sidewall extending between the first and second ends. The first end includes a closed top and the second end includes a threaded aperture. The structures that are rigidly affixed to the tubular body for engaging the tool may be a strap, a plurality of fins, a fin having a hole, or a cylindrical sidewall extending outward from the first end of the tubular body having a groove or opposing holes.

3 Claims, 8 Drawing Sheets

SPECIALLY ADAPTED OIL FILTER CASING

BACKGROUND OF THE INVENTION

1. Field of the Invention

The present invention relates generally to oil filters. More specifically, the invention is an internal combustion engine oil filter casing specially adapted for engagement by a standard hand tool and to an oil filter employing such a casing for assisting an operator in removing the filter from an engine block.

2. Description of the Related Art

A number of practices and devices have been devised for aiding the removal of internal combustion engine oil filters from, or installing the filters to, an engine block.

For example, U.S. Pat. No. 4,266,452 issued on May 12, 1981. to Crist discloses an oil filter wrench that is generally cup-shaped, having an internal surface for engaging the polygonal end. of the filter in the manner of a socket wrench. The open end of the tool is flared to a larger diameter than the filter body for catching oil which escapes as the filter is removed, and an internal space is provided to act as a reservoir for the escaping oil.

U.S. Pat. No. 4,465,595 issued on Aug. 14, 1984 to Cooper discloses an apparatus for assembly and disassembly of a filter construction. A threaded jackscrew is mated to a threaded portion of the filter head and rotatably mounted to the filter canister, but longitudinally confined near the canister top. The assembly accommodates a second class lever whose fulcrum end is received ill a recess in the filter head.

U.S. Pat. No. 4,871,455 issued on Oct. 3, 1989 to Terhune et al. discloses a filter assembly with lockable lug means and a pivotally mounted handle.

U.S. Pat. No. 4,988,437 issued on Jan. 29, 1991 to Gefter et al. discloses an in-line leaf trap having a main body and a separable lid. The main body may have an attached handle.

U.S. Pat. No. 5,000,847 issued on Mar. 19, 1991 to Huang discloses a spin-on type oil filter with an improvement to the normal filter body that allows non-tool assisted, easy hand installation and removal of the filter unit in open and close tolerance situations. The external closed end of the oil filter housing may be provided with at least a single centrally fixed rib, which serves as a handle.

U.S. Pat. No. 5,024,760 issued on Jun. 18, 1991 and U.S. Pat. No. 5,744,032 issued on Apr. 28, 1998 to Kemper disclose an easily removable oil filter and an oil filter attachment having bracket type fins spaced around the circumference of the oil filter body and of the attachment.

U.S. Pat. No. 5,180,489 issued on Jan. 19, 1993 to Bourgeois discloses a filter cartridge having an internal liquid trap.

U.S. Pat. No. 5,230,795 issued on Jul. 27, 1993 to Yang discloses a quick release oil filter having a shell that has a cap enclosed at the bottom, a filter disposed in the shell, a tube disposed in the shell and having a lower end engaged with the engine, and a quick release having a lower end engaged with the tube.

U.S. Pat. No. 5,328,606 issued on Jul. 12, 1994 to Warren et: al. discloses a spin-on oil filter that comprises a tubular body housing a filtering element and a retractable, external handle that can be manually gripped and twisted for filter installation and removal. The handle comprises a pair of spaced apart, elongated legs and an internal grip extending between the legs for grasping by a user.

U.S. Pat. No. 5,469,935 issued on Nov. 28, 1995 to Hewuse discloses an oil filter removing aid being in the form of an annular elastomeric sleeve having an upper end and a lower end.

German Patent No. 1189520, published Mar. 25, 1965, discloses an oil filter wherein the end wall of the filter casing has a pair of abutments on both sides of the filter axis. The abutments act as coupling for a rod-lever during the application of a torque.

French Patent No. 2300600, published October 1976, discloses a filter for liquids that incorporates a cylindrical cover screwed onto a base plate in which are the inlet and outlet holes. The cover has a protuberance on the cover to accept a key for unscrewing it. The protuberance has a finger with two sides that come to an apex. The key has a U-shaped end with two points.

The prior art fails to teach a practice or device which assists an operator to simply, efficiently, and effectively remove an oil filter from an engine block. None of the above inventions and patents, taken either singularly or in combination, is seen to describe the instant invention as claimed. Thus an oil filter casing solving the aforementioned problems is desired.

SUMMARY OF THE INVENTION

An oil filter casing specially adapted for engagement by a standard hand tool and to an oil filter employing such a casing for assisting an operator in removing the filter an engine block. The oil filter casing comprises a generally tubular body and a means for engaging the tool to assist an operator in removing an oil filter from an engine block.

The tubular body has a first end, a second end, and a sidewall extending between the first and second ends. The first end includes a closed top having an exterior surface. The second end includes a threaded aperture, while the sidewall has an exterior surface.

The means for engaging the tool are rigidly are fixed to the tubular body. The means for engaging the tool may be a plurality of straps that are rigidly affixed to the exterior surface of the closed top and/or to the sidewall of the tubular body.

Also, the means for engaging the tool may be a plurality of fins that are rigidly affixed to the exterior surface of the closed top and/or to the sidewall of the tubular body.

Further, the means for engaging the tool may be a cylindrical. sidewall extending outward from the first end of the tubular body. The cylindrical sidewall may include a plurality of grooves embedded in the cylindrical sidewall or may define a plurality of opposing holes.

In addition, the means for engaging the tool may be at least: one fin that is rigidly affixed to the exterior surface of the closed top or sidewall of the tubular body. The fin may define a plurality of holes.

Accordingly, it is a principal object of the invention to provide an oil filter casing specially adapted for engagement by a standard hand tool and to an oil filter employing such a casing for assisting an operator in removing the filter from an engine block.

It is another object of the invention to provide an oil filter casing that makes use of head room to ease removal of an oil filter from an engine block.

It is a further object of the invention to provide an oil filter casing that has a structure rigidly affixed to the casing that assists an operator in removing an oil filter from an engine block.

Still another object of the invention is to provide an oil filter casing that increases the speed at which an oil filter can be removed from an engine block.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 6:
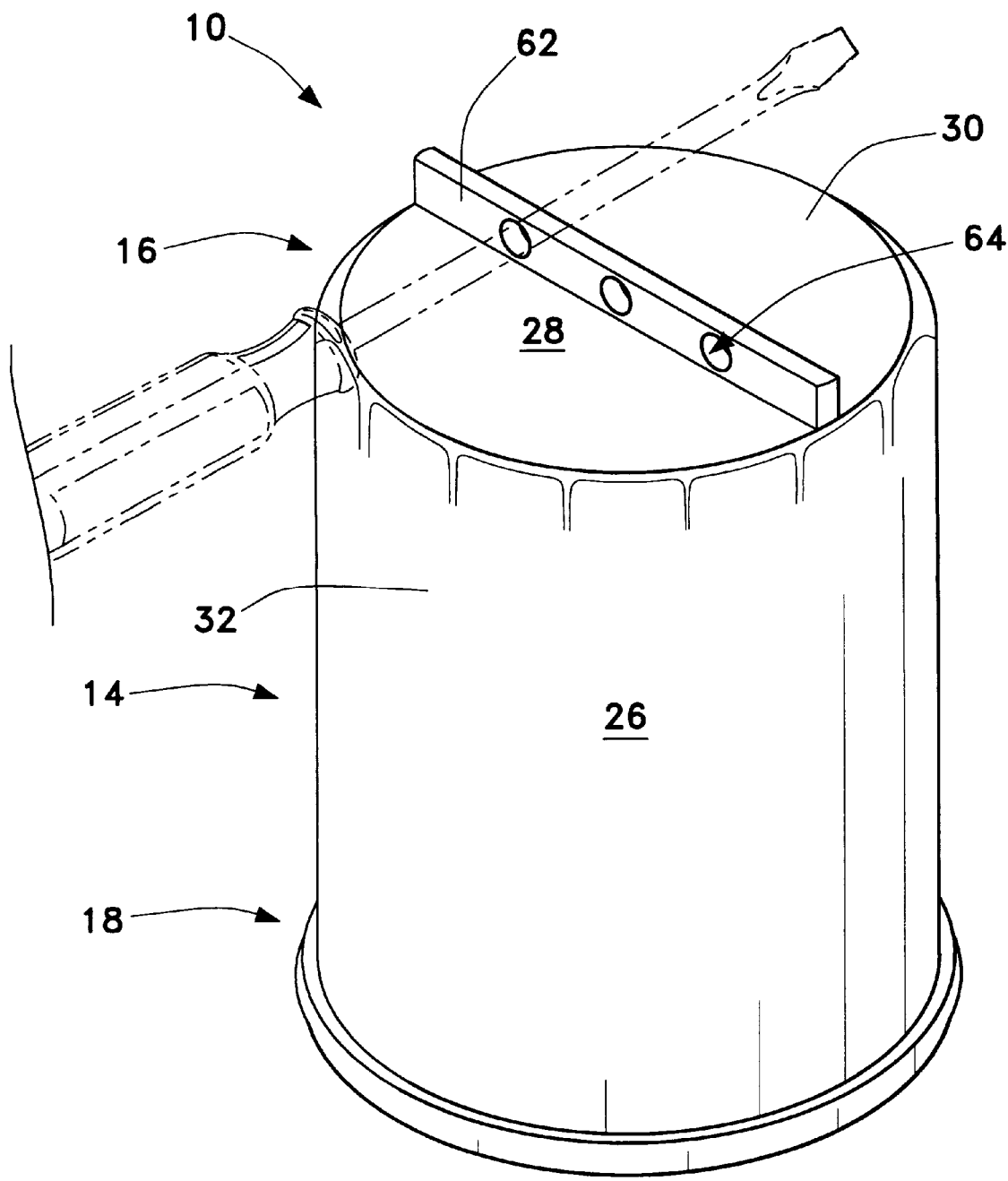
FIG. 6 is an environmental, perspective view of the specially adapted oil filter casing having a fin with holes, with a screwdriver (shown in phantom line), according to the present invention.
Figure 7:
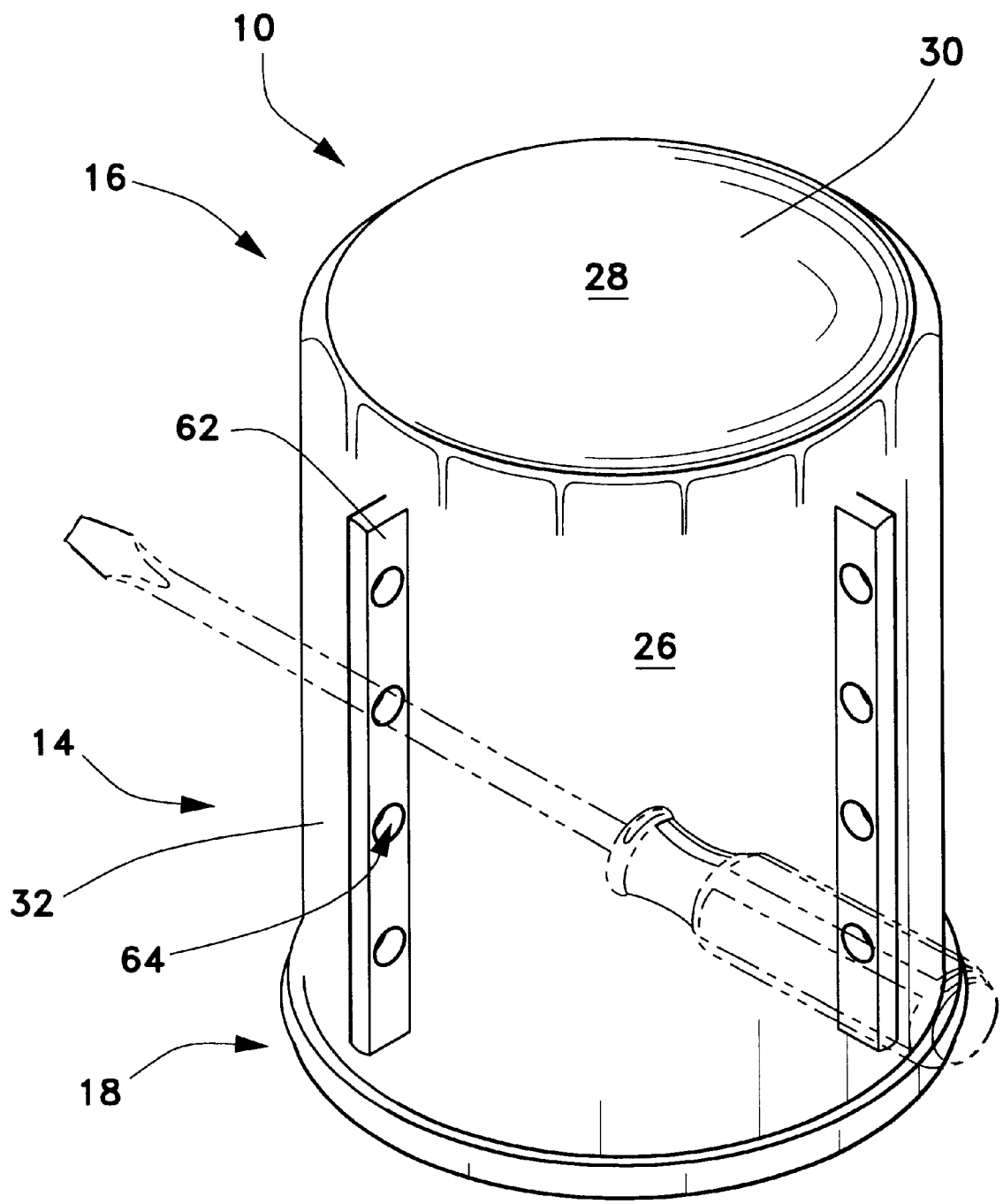
FIG. 7 is an environmental, perspective view of the specially adapted oil filter casing having fins with holes, with a screwdriver (shown in phantom line), according to the present invention.
Figure 8:
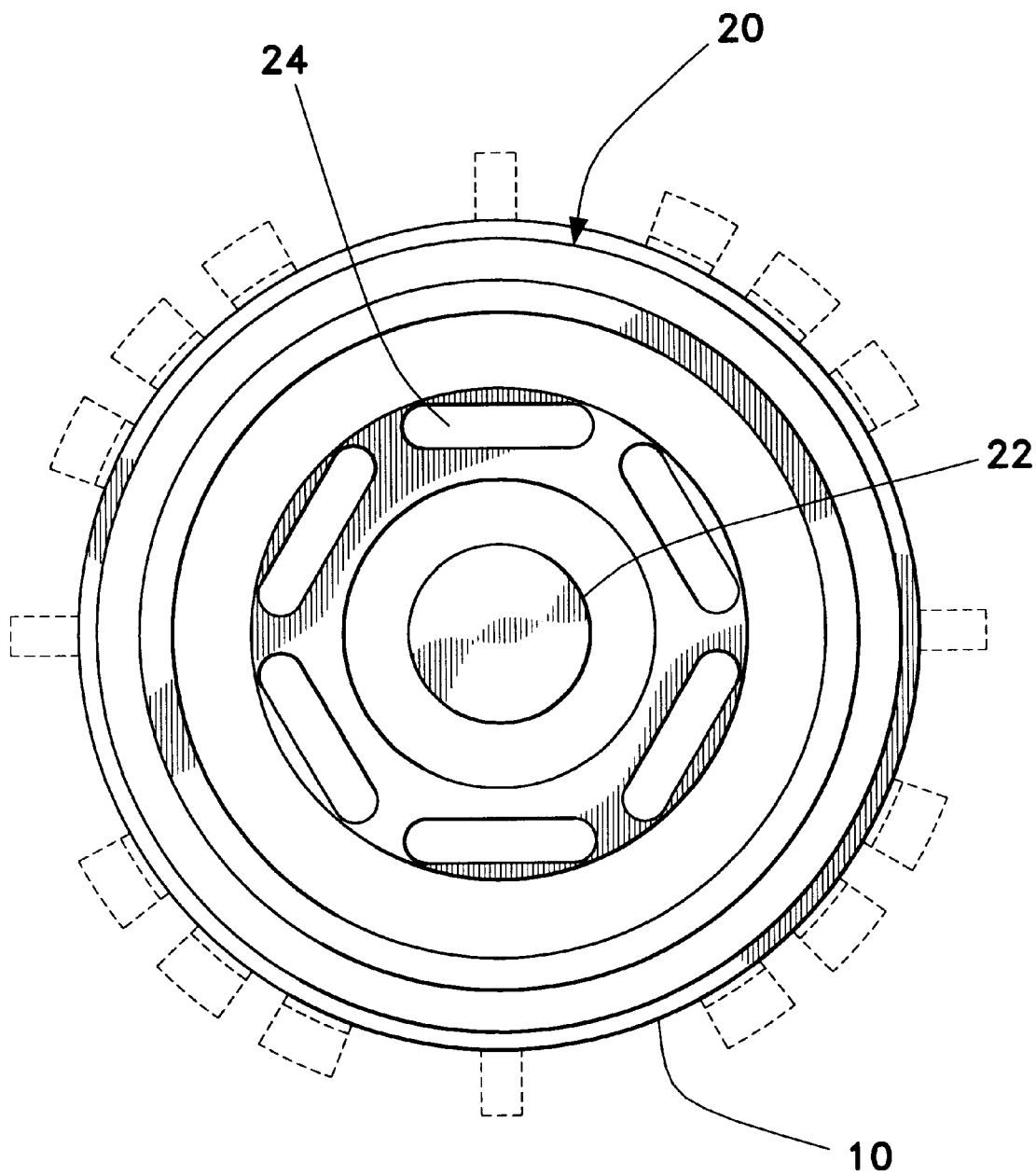
FIG. 8 is a view of the second end of the specially adapted. oil filter casing with different possible engaging means combinations (shown in phantom line) attached thereto, according to the present invention, along with an attachment structure.

Referring to FIGS. 1–8, the present invention is directed to an oil filter casing 10 specially adapted for engagement by a standard hand tool 12 and to an oil filter (FIG. 8) employing such a casing 10 for assisting an operator in removing the filter from an engine block. Most automotive oil filters have a casing 10 in the form of a substantially tubular body 14 being closed at a first end 16 and open at a second end 18. An attachment structure 20 (as shown in FIG. 8) fits within the second end 18 of the oil filter casing 10, and has a perimeter which sealingly engages the perimeter of the second end 18 of the casing 10. An example of a preferred attachment structure that can fit within the second end 18 is taught in U.S. Pat. No. 5,328,606 issued on Jul. 12, 1994 to Warren et al. and fully incorporated herein by reference. The attachment structure 20 has a central threaded opening 22 (as shown in FIG. 8) that allows the oil filter to be secured to the engine block (not shown), and a plurality of other openings 24 (as shown in FIG. 8) distributed about the threaded opening 22. A filter element (not shown) is disposed within the interior of the casing 10 such that fluid (not shown) flowing between the threaded opening 22 and the plurality of other openings 24 in the attachment structure 20 must pass through the filter element. The oil filter casing 10 of the present invention comprises a generally tubular body 14 and a means for engaging the tool 12 to assist an operator in removing an oil filter from an engine block.

As shown in FIGS. 1–7, the tubular body 14 has a first end 16, a second end 18, and a sidewall 26 extending between the first and second ends 16, 18. The first end 16 includes a closed top 28 having an exterior surface 30. The second end 18 includes a threaded aperture 22 (as shown in FIG. 8), while the sidewall 26 has an exterior surface 32.

As shown in FIGS. 1–7, the means for engaging the tool 12 are rigidly affixed to the tubular body 14, and have a sufficient strength and rigidity to withstand a torque applied by the tool 12 during a process of removing the oil filter from the engine block.

Figure 1:
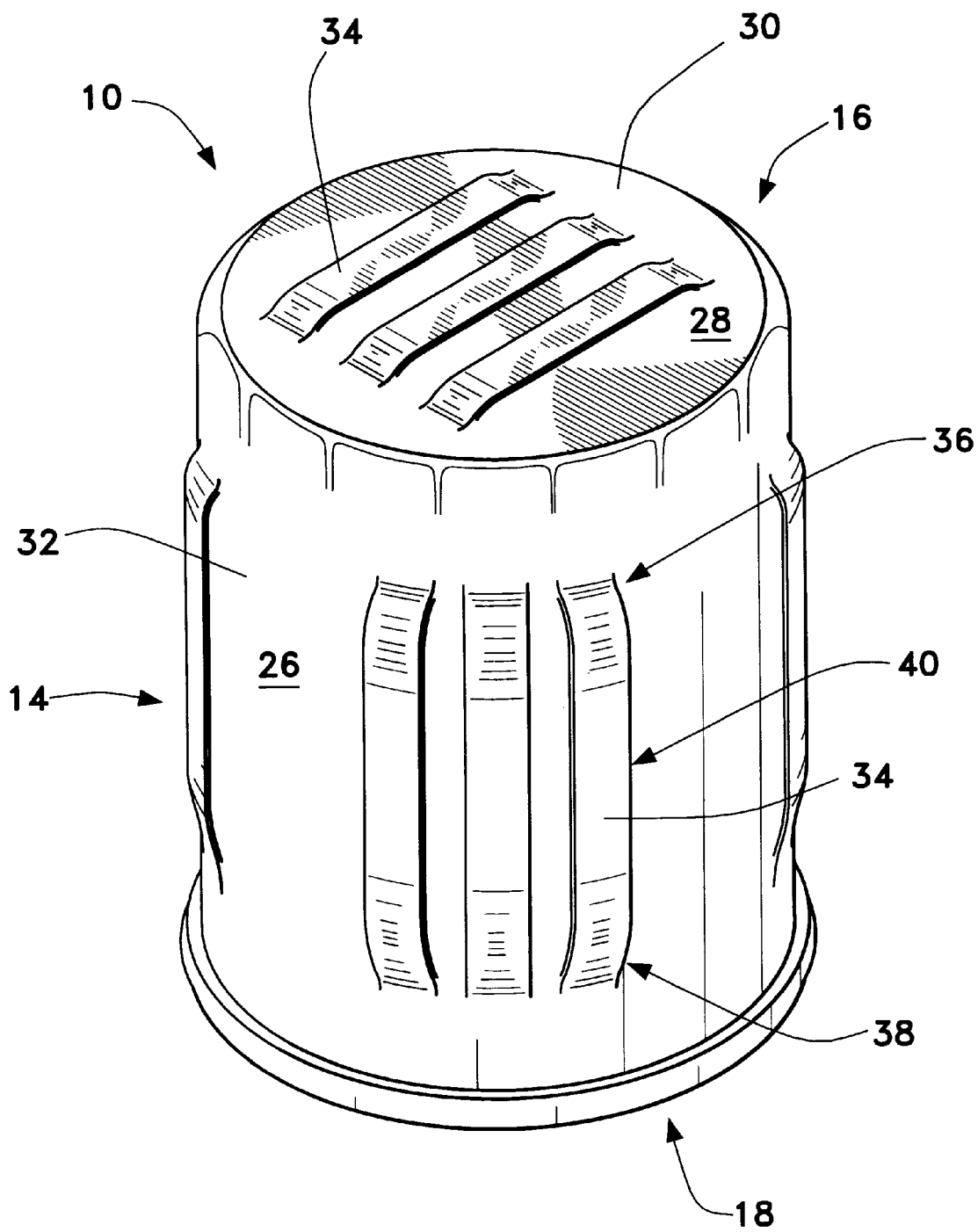
FIG. 1 is a perspective view of the specially adapted oil filter casing having straps according to the present invention.
Figure 2:
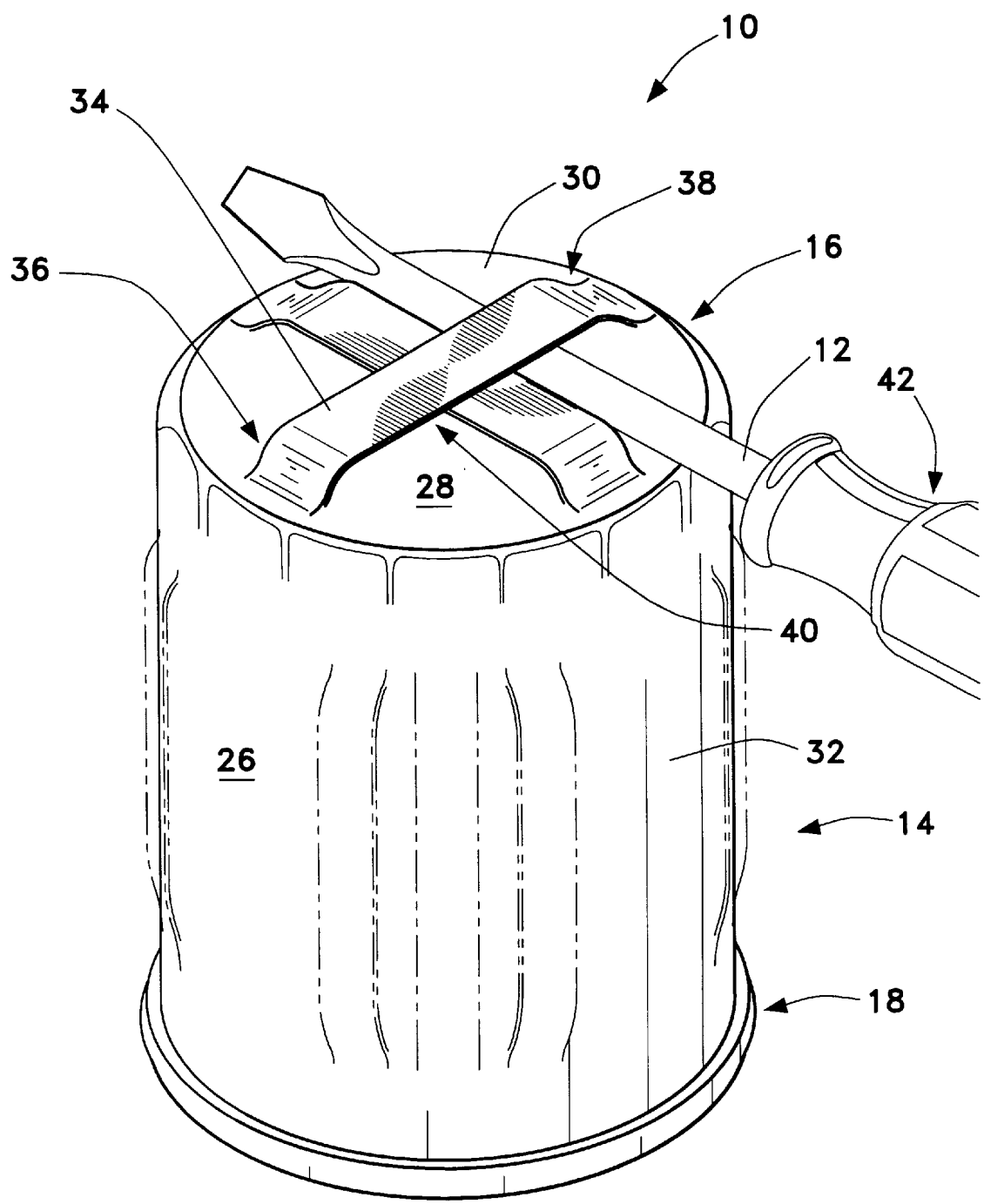
FIG. 2 is an environmental, perspective view of the specially adapted oil filter casing, with a screwdriver and having a possible combination of straps (straps shown in phantom line), according to the present invention.

In the first five embodiments, the means for engaging the tool 12 are rigidly affixed to the first end 16 of the tubular body 14. In the first embodiment and as shown in FIGS. 1 and 2, the means for engaging the tool 12 is a plurality of straps 34 that are rigidly affixed to the exterior surface 30 of the closed top 28. Each strap 34 has a first end 36, a second end 38, and an intermediate portion 40 extending between the ends 36, 38 of the strap 34. The ends 36, 38 of the strap 34 may be rigidly affixed to the exterior surface 30 of the closed top 28 in a variety of positions (as shown in FIGS. 1 and 2) that permit the filter removal process to be achieved. It is preferred that the ends 36, 38 are affixed in the positions shown in FIG. 1 or 2. The attachment of the straps 34 to the exterior surface 30 of the closed top 28 may be accomplished by any well known process in the art, such as welding, molding, brazing, soldering, etc. As shown in FIG. 2, the intermediate portion 40 is spaced apart from the exterior surface 30 of the closed top 28 such that the tool 12 can be inserted between the intermediate portion 40 and the exterior surface 30 of the closed top 28.

In the first embodiment and as shown in FIG. 2, an operator can apply a sufficient torque to remove the filter by first inserting the tool 12 between the intermediate portion 40 and the exterior surface 30 of the closed top 28. The operator can then apply a sufficient force, in a counter clockwise direction, to the handle 42 (as shown in FIGS. 2–7) of the tool 12 so as to make contact with the ends 36, 38 of the straps 34 in appropriate positions (as shown in FIG. 2) and to generate a sufficient torque to remove the filter.

Figure 3:
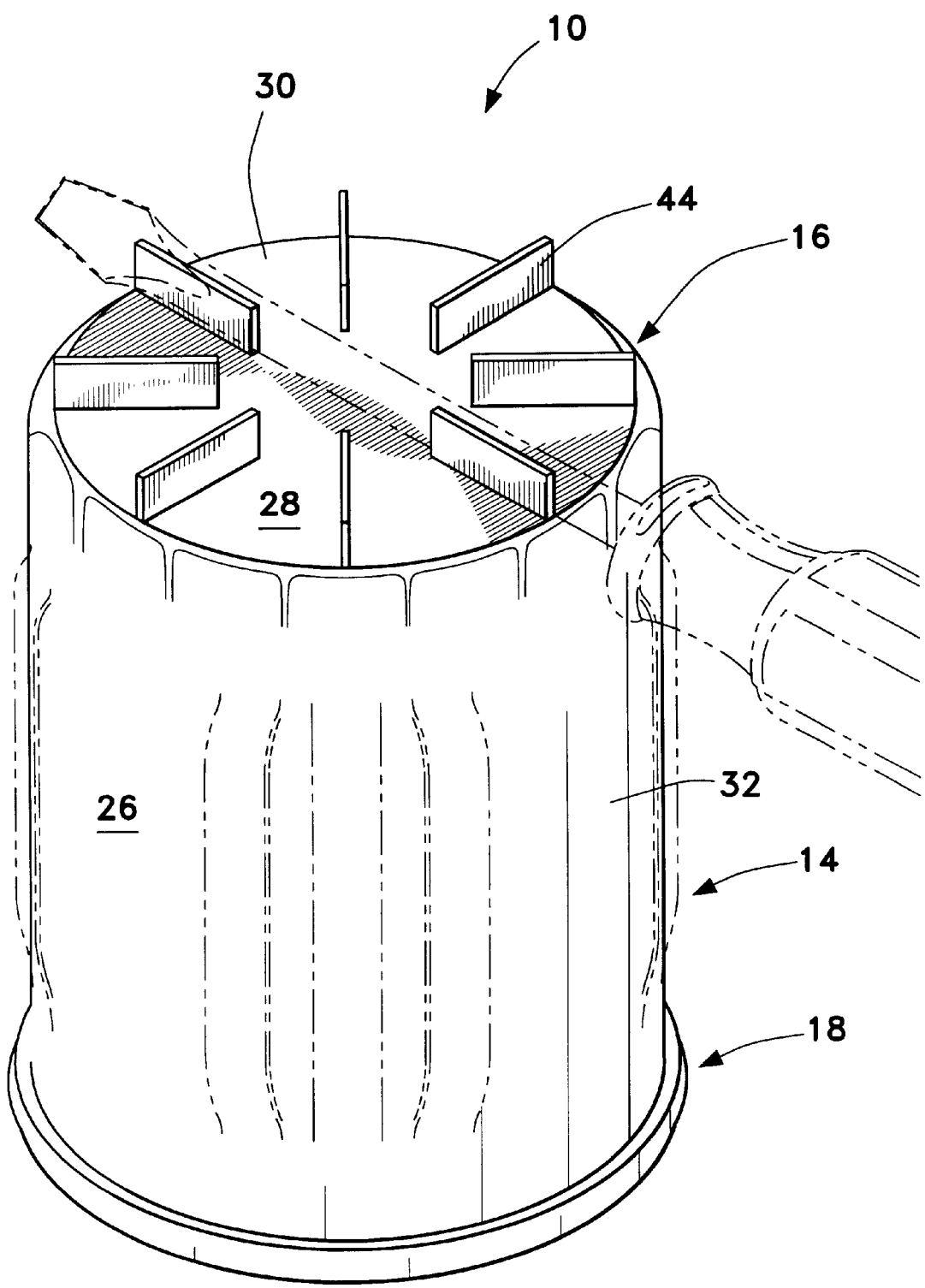
FIG. 3 is an environmental, perspective view of the specially adapted oil filter casing, with a screwdriver and having a possible combination of fins and straps (screwdriver and straps shown in phantom line), according to the present invention.

In the second embodiment and as shown in FIG. 3, the means for engaging the tool 12 is a plurality of fins 44 that are rigidly affixed to the exterior surface 30 of the closed top 28. The fins 44 project perpendicular to the closed top 28, and may be rigidly affixed to the exterior surface 30 of the closed top 28 in a variety of positions that permit the filter removal process to be achieved. It is preferred that the fins 44 are radially distributed on the exterior surface 30 of the closed top 28 in the positions shown in FIG. 3. The attachment of the fins 44 to the exterior surface 30 of the closed top 28 may be accomplished by any well known process in the art, such as welding, molding, brazing, soldering, etc. The particular arrangement of the fins 44 should allow the tool 12 to make contact with at least two of the fins 44 and to engage with the fins 44 in a manner that permits a torque to be applied to the casing 10 using the tool 12.

In the second embodiment and as shown in FIG. 3, an operator can apply a sufficient torque to remove the filter by first placing the tool 12 to the exterior surface 30 of the closed end 28 ar making contact with at least two of the fins 44 so as to engage with the fins 44 in a manner that permits a torque to be applied to the casing 10. The operator can then apply a sufficient force, in a counter clockwise direction, to the handle 42 of the tool 12 so as to make contact with the fins 44 in appropriate positions (as shown in FIG. 3) and to generate a sufficient torque to remove the filter.

Figure 4:
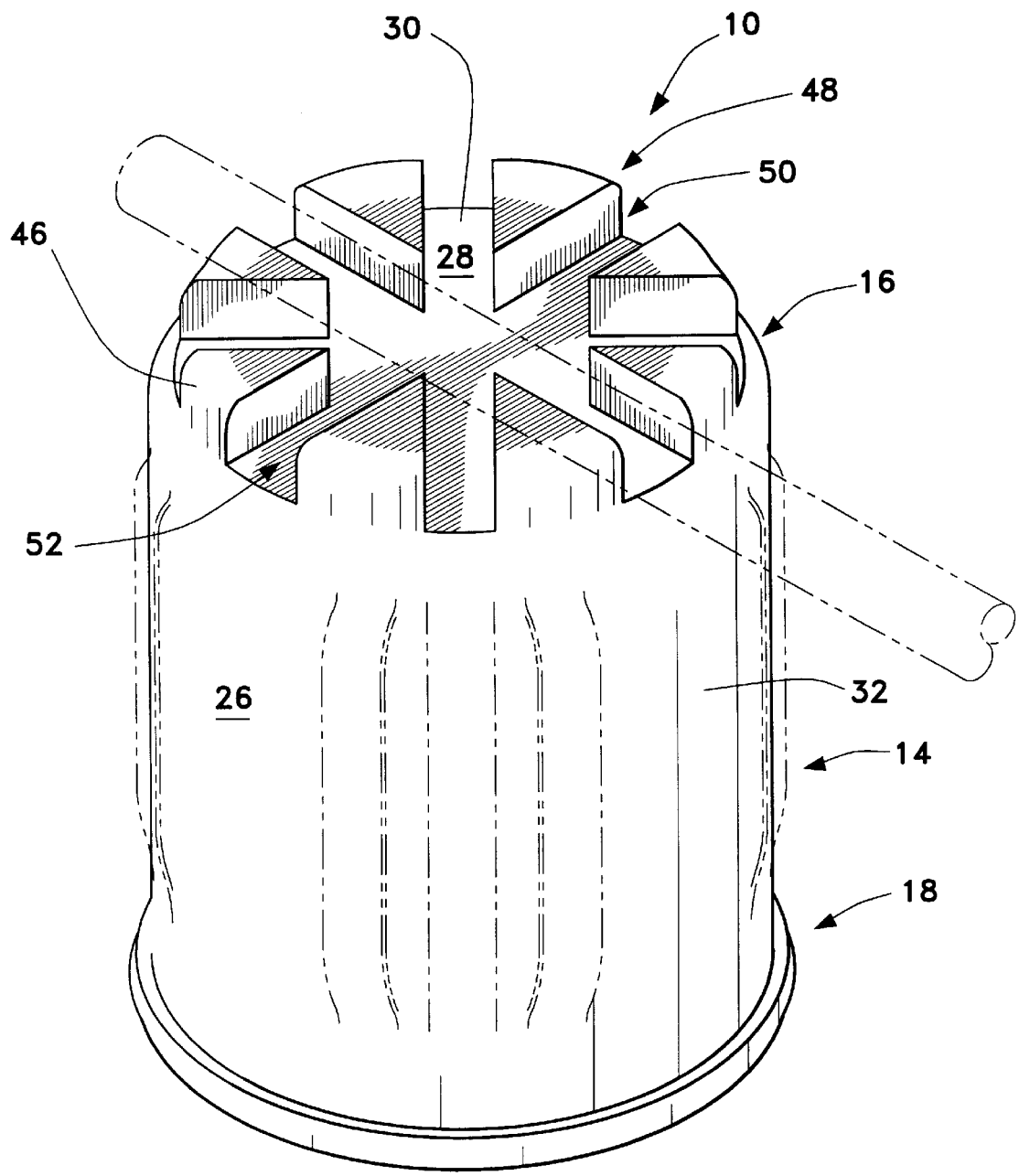
FIG. 4 is an environmental, perspective view of the specially adapted oil filter casing, with a rod and having a possible combination of straps and a cylindrical sidewall with grooves (rod and straps shown in phantom line), according to the present invention.

In the third embodiment and as shown in FIG. 4, the means for engaging the tool 12 is a cylindrical sidewall 46 extending outward from the first end 16 of the tubular body 14. The cylindrical sidewall 46 includes a first end 48, a second end 50, and a plurality of grooves 52 embedded in the cylindrical sidewall 46. The second end 50 of the sidewall 46 being rigidly attached to the first end 16 of the tubular body 14. This attachment may be accomplished by any well known process in the art, such as welding, molding, brazing, soldering, etc. As shown in FIG. 4, each groove 52 is dimensioned and configured to receive and to engage with the tool 12. The grooves 52 may be located in a variety of positions that permit the filter removal process to be achieved. It is preferred that the grooves 52 are located in the positions shown in FIG. 4.

In the third embodiment and as shown in FIG. 4, an operator can apply a sufficient torque to remove the filter by first placing or inserting the tool 12 into a groove 52. The operator can then apply a sufficient force, in a counter clockwise direction, to the handle 42 of the tool 12 so as to make contact with the groove 52 and to generate a sufficient torque to remove the filter.

Figure 5:
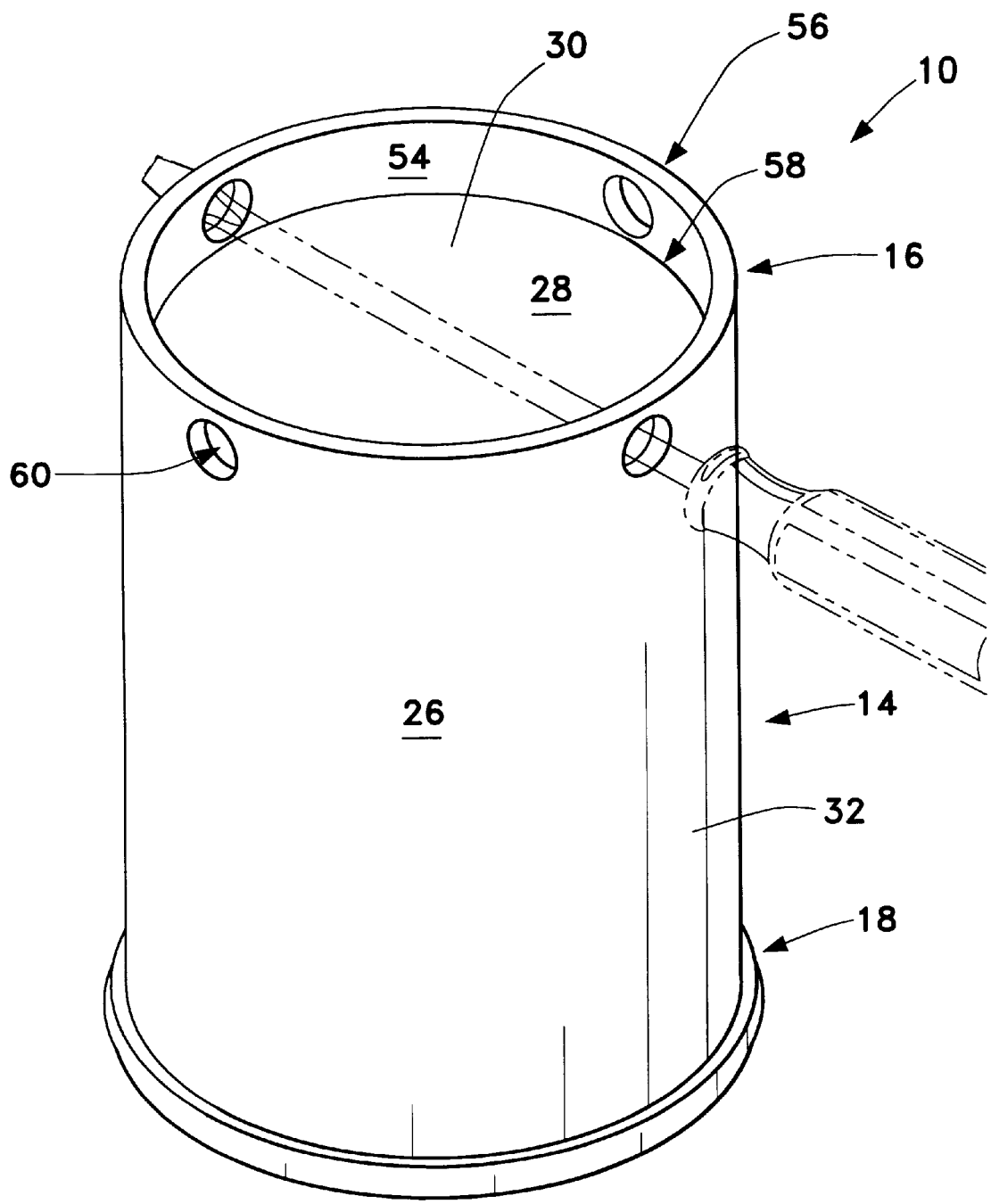
FIG. 5 is an environmental, perspective view of the specially adapted oil filter casing having a cylindrical sidewall with opposing holes, with a screwdriver (shown in phantom line), according to the present invention.

In the fourth embodiment and as shown in FIG. 5, the means for engaging the tool 12 is a cylindrical sidewall 54 extending outward from the first end 16 of the tubular body 14. The cylindrical sidewall 54 includes a first end 56 and a second end 58, and defines a plurality of opposing holes 60. The second end 58 of the sidewall 54 being rigidly attached to the first end 16 of the tubular body 14. This attachment may be accomplished by any well known process in the art, such as welding, molding, brazing, soldering, etc. The holes 60 (as shown in FIG. 5) are perpendicular to the cylindrical sidewall 54, and are dimensioned and configured to receive and to engage with the tool 12.

In the fourth embodiment and as shown in FIG. 5, an operator can apply a sufficient torque to remove the filter by first inserting the tool 12 into two opposing holes 60. The operator can then apply a sufficient force, in a counter clockwise direction, to the handle 42 of the tool 12 so as to make contact with the two opposing holes 60 and to generate a sufficient torque to remove the filter.

In the fifth embodiment and as shown in FIG. 6, the means for engaging the tool 12 is at least one fin 62 that is rigidly affixed to the exterior surface 30 of the closed top 28. The fin 62 projects perpendicular to the closed top 28 and defines a plurality of holes 64. The holes 64 (as shown in FIG. 6) are perpendicular to the fin 62, and are dimensioned and configured to receive and to engage with the tool 12. The fin 62 may be rigidly affixed to the exterior surface 30 of the closed top 28 in a variety of positions that permit the filter removal process to be achieved. It is preferred that the fin 62 is affixed in the position shown in FIG. 6. The attachment of the fin 62 to the exterior surface 30 of the closed top 28 may be accomplished by any well known process in the art, such as welding, molding, brazing, soldering, etc.

In the sixth embodiment and as shown in FIG. 7, the means for engaging the tool 12 is a plurality of fins 62 that are rigidly affixed to the exterior surface 32 of the sidewall 26 of the tubular body 14. Each of the fins 62 projects perpendicular to the sidewall 26 of the tubular body 14 and defines a plurality of holes 64. The holes 64 (as shown in FIG. 7) are perpendicular to the fins 62, and are dimensioned and configured to receive and to engage with the tool 12.

In the fifth and sixth embodiments and as shown in FIGS. 6 and 7, an operator can apply a sufficient torque to remove the filter by first inserting the tool 12 into a hole 64 defined by the fin 62. The operator can then apply a sufficient force, in a counter clockwise direction, to the handle 42 of the tool 12 so as to make contact with the hole 64 and to generate a sufficient torque to remove the filter.

In the seventh embodiment and as shown in FIG. 1, the means for engaging the tool 12 is a plurality of straps 34 that are rigidly affixed to the exterior surface 32 of the sidewall 26 of the tubular body 14. Each strap 34 has a first end 36, a second end 38, and an intermediate portion 40 extending between the ends 36, 38 of the strap 34. As shown in FIG. 1, the ends 36, 38 of the strap 34 may be rigidly affixed to the exterior surface 32 of the sidewall 26 of the tubular body 14 in a variety of positions the permit the filter removal process to be achieved. It is preferred that the ends 36, 38 are affixed in the positions shown in FIG. 1 The attachment of the straps 34 to the exterior surface 32 of the sidewall 26 of the tubular body 14 may be accomplished by any well known process in the art, such as welding, molding, brazing, soldering, etc. The intermediate portion 40 (as shown in FIG. 1) is spaced apart from the exterior surface 32 of the sidewall 26 of the tubular body 14 such that the tool 12 can be inserted between the intermediate portion 40 and the exterior surface 32 of the sidewall 26 of the tubular body 14.

In the seventh embodiment, an operator can apply a sufficient torque to remove the filter by first inserting the tool 12 between the intermediate portion 40 and the exterior surface 32 of the sidewall 26 of the tubular body 14. The operator can then apply a sufficient force, in a counter clockwise direction, to the handle 42 of the tool 12 so as to make contact with the ends 36, 38 of the straps 34 in appropriate positions and to generate a sufficient torque to remove the filter.

All of the means for engaging the tool 12 to assist the operator in removing an oil filter may be made of any suitable material of sufficient strength and rigidity, but it is preferred that these means are made of steel or metal. It is required that the tool 12 is made of sufficient strength and rigidity to be able to create a sufficient torque for removing the oil filter. As shown in FIGS. 2–4 and 8, there may be a variety of different combinations of means for engaging the tool 12 (shown in phantom lines) that may be rigidly affixed to the tubular body 14. Also, as shown in FIGS. 3–7, there may be a variety of different types of hand tools (shown in phantom lines) that may be able to generate a sufficient torque for removing the oil filter.

It is to be understood that the present invention is not limited to the embodiments described above, but encompasses any and all embodiments within the scope of the following claims.

We claim:

1. An oil filter comprising:

a filter element disposed within a generally tubular body having a first end, a second end, and a cylindrical sidewall extending between said first and second ends, said first end having a closed tops wherein said closed top has an exterior surface, said second end having a threaded aperture, said sidewall having an exterior surface defining an outer diameter; and means for engaging a tool to assist an operator in removing an oil filter rigidly affixed to said tubular body, and having sufficient strength and rigidity to withstand a torque applied by the tool during a process of removing the oil filter from an engine block;

wherein said means for engaging the tool is a cylindrical sidewall extension extending outward from said first end of said tubular body, said sidewall extension having an outer diameter substantially equal to said outer diameter of said tubular body, and said cylindrical sidewall extension defining at least two diametrically opposing holes therethrough.

2. The oil filter according to claim 1, wherein each of said at least two diametrically opposing holes being perpendicular to said cylindrical sidewall extension, and being dimensioned and configured to receive and to engage the tool.

3. The oil filter according to claim 2, wherein said at least two diametrically opposing holes include a plurality of hol disposed about said cylindrical sidewall extension, said holes being equidistantly spaced apart.

* * * * *